UNITED STATES PATENT OFFICE.

WALTON C. TIFFANY, OF NEW YORK, N. Y., ASSIGNOR OF ONE-HALF TO BREWSTER CAMERON, OF TUCSON, ARIZONA.

PROCESS OF MAKING TANNING-EXTRACTS.

SPECIFICATION forming part of Letters Patent No. 480,376, dated August 9, 1892.

Application filed September 2, 1891. Serial No. 404,555. (No specimens.)

*To all whom it may concern:*

Be it known that I, WALTON C. TIFFANY, a citizen of the United States, residing in the city, county, and State of New York, have invented certain new and useful Improvements in the Process of Making Tanning-Extracts, of which the following is a specification.

The object of my invention is to produce a dried tanning-extract from the root of the *Rumex hymenosepalum torr* or canaigre-plant.

I find after repeated experiment that if the canaigre-root be macerated or otherwise comminuted and then placed in a vat with water at a low temperature of 140° Fahrenheit or less a liquid extract is obtained, which may be reduced by evaporation *in vacuo* or otherwise to a dried form, which has all the valuable tanning properties of the liquid extract less moisture and excess of non-tanning products and with less liability to oxidation and fermentation. Preferably distilled water is used, and preferably, also, a small proportion of a suitable antiseptic—such as hyposulphite of soda—is added to the water or to the product at any convenient stage to prevent decomposition or fermentation of the product. By the use of water at a low temperature the extraction of considerable starchy matter contained in the root is avoided, and I have thus succeeded in producing for the first time this valuable tanning-extract in dry form. Heretofore this root and liquor therefrom have been affected by atmospheric changes, fermentation, &c., causing discoloration, mold, and other damage or detriment. In the dry form which my process renders possible these detrimental effects are obviated and a tanning product of great compactness and utility is produced.

I am aware that heretofore tanning-extracts have been made by hot-leaching and then reduced to a semi-liquid form for commercial use, which is the form generally employed for similar extracts. The novelty of my invention consists in the use, with this particular root, of liquid at a low temperature and its reduction to a substantially dry condition, in which condition it can be shipped in bags instead of requiring barrels, as has been the case with all former tanning products. The trouble and cost of liquid-tight packages and of shipment thereof and danger of leakage and breakage are thus materially lessened. I find by experimenting on this particular product that the use of a low temperature has the advantage of producing a pure product not obtainable by hot leaching, inasmuch as the hot water extracts, together with the tannin, the non-tannable substances, which are merely detrimental to the product. The dry extract prepared in this way is of much finer appearance, of better quality, more salable, and more cheaply and easily transported. By this process also the by-product or refuse is left more valuable, the starchy and other matters being left therein to such a degree as to materially increase its bulk and inflammable quality.

Having thus described my invention, the following is what I claim as new therein and desire to secure by Letters Patent:

The process of obtaining a dry tanning-extract from canaigre-root, which consists in comminuting or macerating the root, subjecting it to a bath of water at about 140° Fahrenheit or less, and reducing the liquid extract so obtained to a commercially-dry state by vacuo or otherwise, substantially as set forth.

In testimony of which invention I have hereunto set my hand this 27th day of August, 1891.

WALTON C. TIFFANY.

Witnesses:
HARRY E. KNIGHT,
EDWARD BRANDT.